United States Patent
Hong et al.

(10) Patent No.: US 8,156,256 B2
(45) Date of Patent: Apr. 10, 2012

(54) METHOD FOR MANAGING LOGICAL ADDRESS AND DEVICE THEREOF

(75) Inventors: Jin-woo Hong, Suwon-si (KR); Dae-gyu Bae, Suwon-si (KR); Dong-young Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 281 days.

(21) Appl. No.: 11/927,876

(22) Filed: Oct. 30, 2007

(65) Prior Publication Data

US 2008/0270636 A1 Oct. 30, 2008

Related U.S. Application Data

(60) Provisional application No. 60/913,621, filed on Apr. 24, 2007.

(30) Foreign Application Priority Data

Jul. 6, 2007 (KR) .......................... 10-2007-0068287

(51) Int. Cl.
*G06F 3/00* (2006.01)
*G06F 12/00* (2006.01)
*G06F 12/02* (2006.01)
(52) U.S. Cl. ..................... 710/9; 710/3; 711/1
(58) Field of Classification Search .................. None
See application file for complete search history.

(56) References Cited

U.S. PATENT DOCUMENTS

| | | | | |
|---|---|---|---|---|
| 4,989,137 A | * | 1/1991 | Oxley et al. | 711/203 |
| 6,128,509 A | * | 10/2000 | Veijola et al. | 455/556.1 |
| 6,189,050 B1 | | 2/2001 | Sakarda | |
| 6,332,023 B1 | * | 12/2001 | Porter et al. | 379/242 |
| 6,341,109 B1 | * | 1/2002 | Kayanuma | 369/47.14 |
| 6,389,491 B1 | * | 5/2002 | Jacobson et al. | 710/62 |
| 6,470,382 B1 | * | 10/2002 | Wang et al. | 709/220 |
| 6,522,654 B1 | * | 2/2003 | Small | 370/400 |
| 6,957,276 B1 | * | 10/2005 | Bahl | 709/245 |
| 6,976,105 B1 | | 12/2005 | Wright | |

(Continued)

FOREIGN PATENT DOCUMENTS

JP 5244161 A 9/1993

(Continued)

OTHER PUBLICATIONS

Hitachi et al.: "HDMI Specification Version 1.3a" [Online], dated Nov. 10, 2006, XP002476103, pp. 8-139.*

(Continued)

*Primary Examiner* — Henry Tsai
*Assistant Examiner* — Michael Sun
(74) *Attorney, Agent, or Firm* — Sughrue Mion, PLLC

(57) ABSTRACT

An address management method and a device thereof are provided. The address management method includes determining by a device whether all logical addresses corresponding to a type of the device are currently being used by external devices; setting by the device a non-use logical address as a logical address of the device, if it is determined that one of the logical addresses is currently not in use; and setting by the device a predetermined logical address as a logical address of the device, if it is determined that all the logical addresses are currently being used. Therefore, logical addresses may be allocated to a device even if all logical addresses corresponding the type of the device are currently being used.

21 Claims, 6 Drawing Sheets

U.S. PATENT DOCUMENTS

| | | | |
|---|---|---|---|
| 2003/0135709 A1* | 7/2003 | Niles et al. | 711/220 |
| 2003/0229900 A1* | 12/2003 | Reisman | 725/87 |
| 2004/0199703 A1 | 10/2004 | Wurth et al. | |
| 2005/0160471 A1 | 7/2005 | Cohen | |
| 2006/0047800 A1* | 3/2006 | Caveney et al. | 709/223 |
| 2006/0184823 A1* | 8/2006 | Matsuki et al. | 714/12 |
| 2006/0224818 A1* | 10/2006 | Stewart | 711/103 |
| 2006/0248158 A1* | 11/2006 | Ha et al. | 709/208 |
| 2007/0011712 A1* | 1/2007 | White et al. | 725/112 |
| 2007/0300243 A1* | 12/2007 | Gross et al. | 719/330 |
| 2008/0098426 A1* | 4/2008 | Candelore | 725/38 |
| 2008/0151113 A1* | 6/2008 | Park | 348/500 |
| 2008/0244680 A1* | 10/2008 | Mochizuki | 725/133 |
| 2009/0049205 A1* | 2/2009 | Park | 710/4 |
| 2009/0077492 A1* | 3/2009 | Ida | 715/810 |
| 2009/0138779 A1* | 5/2009 | Funabiki et al. | 714/749 |
| 2009/0207308 A1* | 8/2009 | Shoji | 348/554 |
| 2009/0210539 A1* | 8/2009 | Funabiki et al. | 709/228 |

FOREIGN PATENT DOCUMENTS

| | | |
|---|---|---|
| JP | 2003-298960 A | 10/2003 |
| JP | 2004-038384 A | 2/2004 |
| KR | 10-2003-0075061 A | 9/2003 |
| KR | 1020060021513 A | 3/2006 |
| KR | 1020070036892 A | 4/2007 |

OTHER PUBLICATIONS

Whole Supplement 1: "Consumer Electronics Control (CEC)". Supplement to HDMI Specification Version 1.3a.*

* cited by examiner

FIG. 3

CEC Table 5 Logical Addresses

| Logical Address | Device |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered (as initiator address) Broadcast (as destination address) |

<Report Physical Address>
-[Physical Address]
-[Device type]
  -TV:0
  -Recording Device:1
  -Reserved:2
  -Tuner:3
  -Playback Device:4
  -Audio System:5

METHOD FOR MANAGING LOGICAL ADDRESS AND DEVICE THEREOF

CROSS-REFERENCE TO RELATED APPLICATIONS

This application claims priority from U.S. Provisional Application No. 60/913,621, filed Apr. 24, 2007 in the United States Patent and Trademark Office, and Korean Patent Application No. 10-2007-0068287, filed Jul. 6, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to managing addresses, and more particularly, to managing logical addresses in order to support a greater number of logical addresses of connected devices.

2. Description of the Related Art

FIG. 1 shows a video system connected according to the High Definition Multimedia Interface (HDMI) Consumer Electronics Control (CEC) specification. The video system of FIG. 1 is constituted by connecting a digital television (DTV) 10 to digital versatile disc (DVD) players 20-1 to 20-4 according to the HDMI CEC specification.

Video signals as well as control signals are transmitted and received between the DTV 10 and the DVD players 20-1 to 20-4. Accordingly, the DTV 10 and the DVD players 20-1 to 20-4 need to have unique logical addresses.

However, only a limited number of logical addresses are provided in the HDMI CEC specification. Additionally, logical addresses are pre-allocated according to a type of a device.

A table of logical addresses is shown in FIG. 3.

Referring to FIG. 3, if the DVD players are playback devices, logical addresses "4", "8" and "11" are sequentially allocated to the DVD players.

In other words, if the DVD players of FIG. 1 are sequentially connected, logical addresses "4", "8" and "11" may be allocated to the first DVD player 20-1, the second DVD player 20-2 and the third DVD player 20-3, respectively.

However, if there is no logical address to be allocated to the fourth DVD player 20-4, unregistered logical address "15" may be allocated to the fourth DVD player 20-4, causing the fourth DVD player 20-4 to be inactivated.

As a result, logical addresses can support only one TV, three recording devices, four tuners, three playback devices and one audio system, and it is not possible to support a greater number of devices other than those listed above.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention is to support a greater number of addresses in addition to predefined logical addresses.

The present invention provides an address management method and a device thereof in which an unregistered address is directly not set as the logical address, and non-use addresses "12" and "13" that are currently reserved are used as logical addresses even when there is no logical address corresponding to the type of the audio/video (AV) device, so that it is possible to use additional logical addresses regardless of the type of device, which can permit a greater number of devices to be supported.

According to an aspect of the present invention, there is provided an address management method comprising determining by a device whether all logical addresses corresponding to the type of the device are currently being used by external devices; setting by the device a non-use logical address as a logical address of the device, if it is determined that one of the logical addresses is currently not in use; and setting by the device a predetermined logical address as a logical address of the device, if it is determined that all the logical addresses are currently being used.

The external devices may be connected according to the HDMI CEC specification.

The logical addresses may comply with a logical address specification predefined according to the HDMI CEC specification.

A reserved address among the logical addresses defined in the HDMI CEC specification may be used as the predetermined logical address.

The determining may comprise transmitting by the device polling messages to the external devices, at the logical addresses corresponding to its device type; and determining that the corresponding logical addresses are currently being used, if an acknowledge (ACK) packet is received from one of the external devices as a response to the polling messages.

The method may further comprise transmitting a data packet comprising a physical address field and a device type field, after the logical addresses are acquired; and extracting data of the device type field from the data packet and interpreting the extracted data.

The method may further comprise transmitting the logical addresses by the device. The extracting and interpreting may be performed only when the logical address is not the predetermined address.

According to another aspect of the present invention, there is provided a device comprising an interface which enables the device to be connected to an external device; and a controller which determines whether all logical addresses corresponding to the type of the device are currently being used by external devices, which sets a non-use logical address as a logical address of the device if it is determined that one of the logical addresses is currently not in use, and which sets a predetermined logical address as a logical address of the device if it is determined that all the logical addresses are currently being used.

A reserved address among the logical addresses defined in the HDMI CEC specification may be used as the predetermined logical address.

According to another aspect of the present invention, there is provided a display device comprising an interface which receives a data packet comprising a device type field from an external device; and a controller which extracts data of the device type field and interprets the extracted data if a predetermined address is used as a logical address of the external device.

BRIEF DESCRIPTION OF THE DRAWINGS

The above and/or other aspects of the present invention will be more apparent by describing certain exemplary embodiments of the present invention with reference to the accompanying drawings, in which:

FIG. 3 is a table of logical addresses according to the CEC specification;

DETAILED DESCRIPTION OF THE EXEMPLARY EMBODIMENTS

Figure 1:
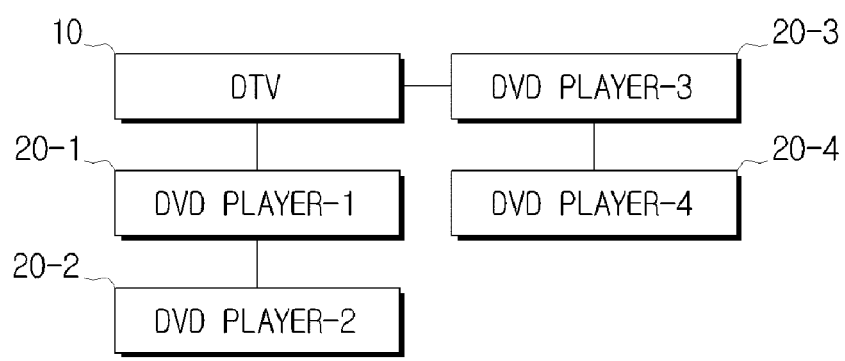
FIG. 1 is a diagram of a video system connected according to the HDMI CEC specification.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 2:
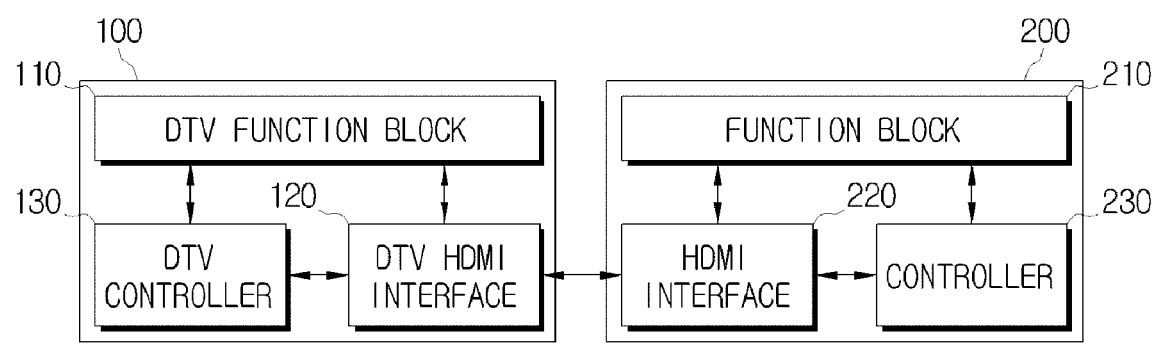
FIG. 2 is a block diagram of a video system to which the present invention is applicable.

FIG. 2 is a block diagram of a video system to which the present invention is applicable. The video system of FIG. 2 is constituted by connecting a DTV 100 to an AV device 200 according to the HDMI CEC specification.

As shown in FIG. 2, the DTV 100 comprises a DTV function block 110, a DTV HDMI interface 120, and a DTV controller 130.

The DTV function block 110 performs the original function of the DTV. Specifically, the DTV function block 110 performs signal processing such as decoding and scaling with respect to a broadcast signal received from a broadcasting station wirelessly or via a cable, and displays the processed broadcast signal on a display so that a user can view a broadcast screen. The DTV function block 110 may display video corresponding to a video signal received from the AV device 200 through the DTV HDMI interface 120 on a display.

The DTV HDMI interface 120 is connected to the AV device 200 according to the HDMI CEC specification, so that video signals and messages can be transmitted and received between the DTV 100 and the AV device 200.

The DTV controller 130 controls the operation of the DTV function block 110 according to a user command. The DTV controller 130 may also control the AV device 200 by sending a control command to the AV device 200 through the DTV HDMI interface 120.

Additionally, the DTV controller 130 searches for the AV device 200 connected through the DTV HDMI interface 120, to obtain the logical address and the physical address of the AV device 200.

The AV device 200 of FIG. 2 comprises a function block 210, an HDMI interface 220, and a controller 230.

The function block 210 performs original functions of the AV device 200. For example, if the AV device 200 is a playback device, the function block 210 may read a video signal recorded in a recording medium mounted therein, and may provide the read video signal to the DTV 100 through the HDMI interface 220.

The HDMI interface 220 is connected to the DTV 100 according to the HDMI CEC specification, so that video signals and messages can be transmitted and received between the DTV 100 and the AV device 200.

The controller 230 controls the operation of the function block 210 in response to the control command of the DTV controller 130 which is transmitted through the HDMI interface 220. If the AV device 200 is connected to the DTV 100, the controller 230 may obtain its logical address using the HDMI interface 220.

FIG. 3 shows logical addresses according to the CEC specification. In other words, each unique logical address is allocated to each source according to the type of source.

For example, logical address "0" is allocated to a DTV, logical addresses "4" and "5" are allocated to a DVD receiver, and logical address "8" is allocated to a DVD player. In addition, unique logical addresses may be allocated to other types of devices.

In particular, the DVD receiver has both a playback function and an audio function, so both logical address "4" indicating the playback function and logical address "5" indicating the audio function may be allocated to the DVD receiver. The DVD receiver may selectively perform the playback function or the audio function, or simultaneously perform both the playback function and the audio function.

Hereinafter, a process for allocating logical addresses of the AV device 200 in the video system of FIG. 2 will be described in detail with reference to FIG. 4.

Figure 4:
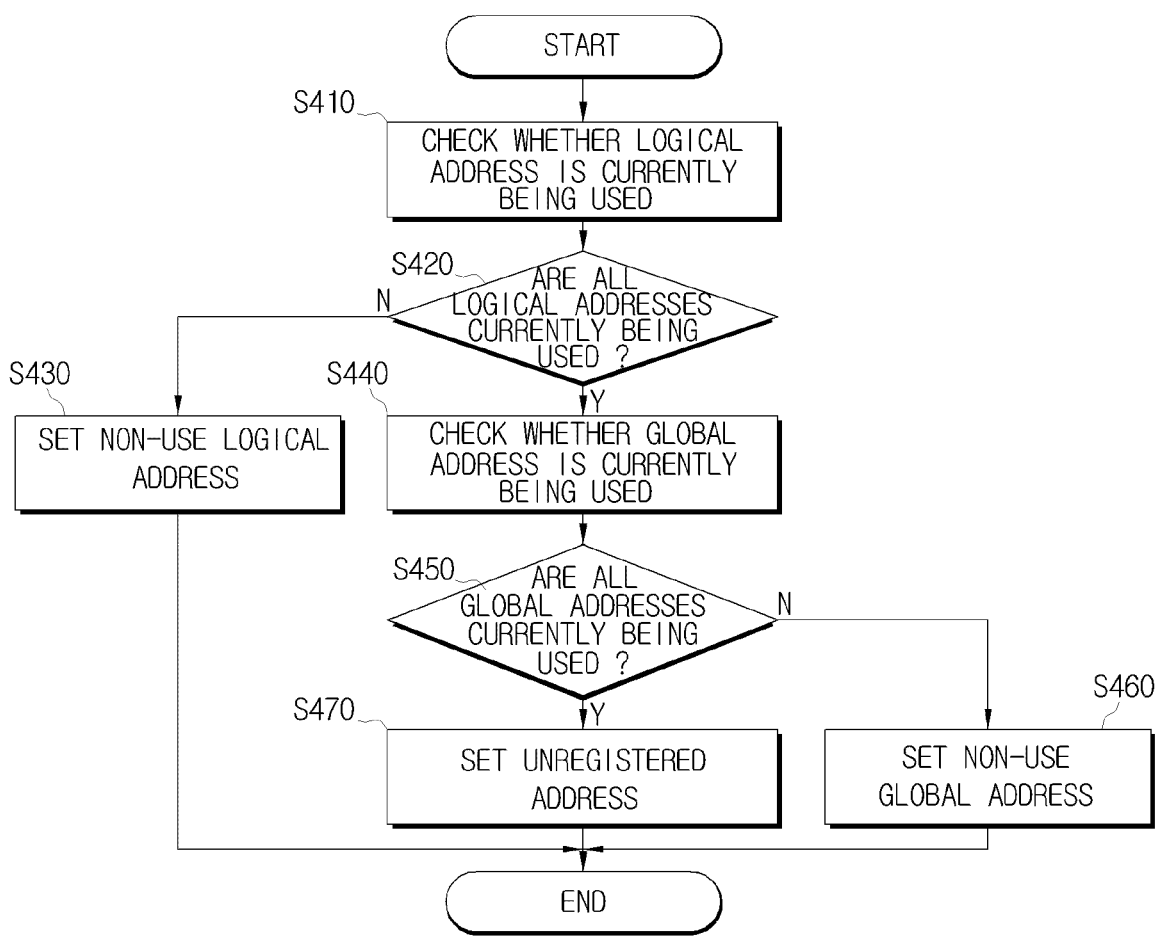
FIG. 4 is a flowchart explaining an address management method according to an exemplary embodiment of the present invention.

FIG. 4 is a flowchart explaining a method by which the AV device 200 acquires its logical address in a network, according to an exemplary embodiment of the present invention.

It is assumed that the AV device 200 is a DVD player and is initially connected to the network.

The controller 230 of the AV device 200 checks whether a logical address corresponding to the type of the device is currently being used in the network (S410).

Specifically, since it is assumed during operation S410 that the AV device 200 is a DVD player, the controller 230 may search for a logical address corresponding to a playback device. Accordingly, logical address "4" may be allocated to the AV device 200, as shown in the table of FIG. 3, and the AV device 200 may then transmit polling messages at logical address "4". Additionally, it is assumed that the AV device 200 is initially connected in the network, so no other AV device may be connected to logical address "4". Therefore, the AV device 200 cannot receive an acknowledge (ACK) packet as a response to the polling messages.

Accordingly, the AV device 200 may determine that there is a non-use address among the logical addresses corresponding to the type of the device (S420-N).

Non-use address "4" may be then set as a logical address of the AV device 200 (S430).

It is assumed that the AV device 200 is a DVD player and is connected to the network for the fourth time.

In this situation, logical addresses "4", "8" and "11" are allocated to the DVD players which have been connected as described above.

The controller 230 of the AV device 200 checks whether a logical address corresponding to the type of the device is currently being used in the network (S410).

Specifically, since it is assumed during operation S410 that the AV device 200 is a DVD player, the controller 230 may search for a logical address corresponding to a playback device. Accordingly, logical address "4" may be allocated to the AV device 200, as shown in the table of FIG. 3, and the AV device 200 may then transmit polling messages at logical address "4". However, since logical address "4" has already been allocated to another DVD player, the AV device 200 may receive an ACK packet as a response to the polling messages.

Thereafter, the AV device 200 may transmit polling messages at the next logical addresses "8" and "11", and may receive ACK packets in the same manner as described above.

Accordingly, the AV device 200 may recognize that all logical addresses corresponding to the type of the device are currently being used (S420-Y).

The controller 230 of the AV device 200 checks whether a global address is currently being used in the network (S440).

In the exemplary embodiment of the present invention, a logical address space to be used regardless of the type of device is referred to as a "global address". Specifically, reserved addresses "12" and "13" may be used as global addresses in the exemplary embodiment of the present invention.

In greater detail, during operation S440, the polling messages may be transmitted to global address "12", but as logical address "12" is currently not in use, an ACK packet cannot be received as a response to the polling messages.

Therefore, the AV device 200 recognizes that a non-use address exists among the global addresses (S450-N).

Subsequently, non-use global address "12" may be set as a logical address of the AV device 200 (S460).

If both global addresses "12" and "13" are already being used in operation S450 (S450-Y), unregistered address "15" may inevitably be set as a logical address of the AV device 200 (S470).

Figures 5A, 5B:
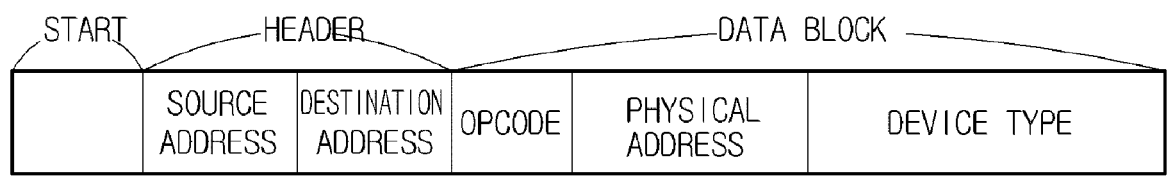
FIGS. 5A and 5B are diagrams showing a physical address reporting packet to which the present invention is applicable.

FIG. 5A is a diagram of a message structure according to an exemplary embodiment of the present invention.

As shown in FIG. 5A, the message comprises a start bit which indicates the start of the message, a header block which indicates logical addresses of a source and a destination, and a data block which comprises data to be transmitted and OPCODE. In particular, a Report Physical Address message is transmitted through the data block.

FIG. 5B is a diagram of the Report Physical Address message structure according to an exemplary embodiment of the present invention.

As shown in FIG. 5B, the Report Physical Address message may be substantially divided into a Physical Address field and a Device type field. The Device type field comprises data regarding the type of AV device. For example, if the AV device is a TV, data "0" may be stored, if the AV device is a recording device, data "1" may be stored, and if the AV device is a tuner, data "3" may be stored.

Figure 6:
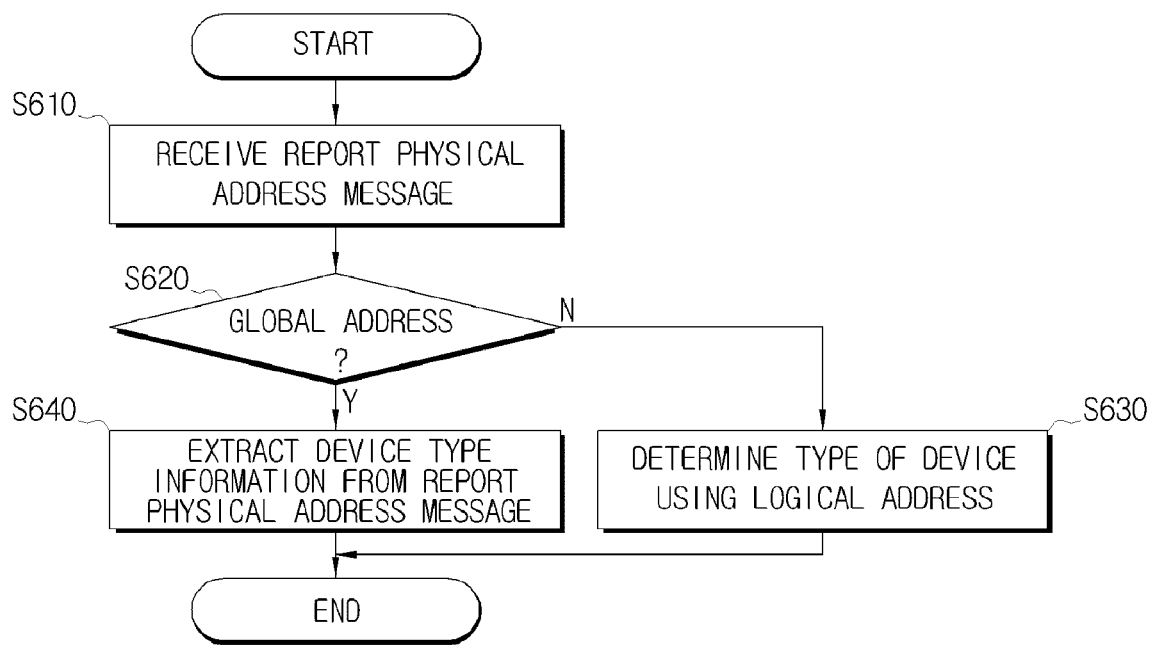
FIG. 6 is a flowchart explaining a method for extracting device type information, according to an exemplary embodiment of the present invention.

Hereinafter, a process by which the DTV 100 receives the messages shown in FIGS. 5A and 5B from the AV device 200, extracts device type information on the AV device 200 and interprets the extracted information will be described in detail with reference to FIG. 6.

The DTV 100 receives a message having the structure shown in FIG. 5A from the AV device 200 (S610).

The DTV controller 130 determines whether the source address contained in the header block of the messages, that is, the logical address of the source, is a global address (S620).

If it is determined that the source address is not a global address (S620-N), the DTV controller 130 may determine the type of the AV device 200 using only the logical address of the source (S630). For example, when the logical address of the source is "1", "2" and "9", it is determined that the AV device 200 is a recording device, and when the logical address of the source is "3", "6", "7" and "10", it is determined that the AV device 200 is a tuner. Additionally, when the logical address of the source is "4", "8" and "11", it is determined that the AV device 200 is a playback device, and when the logical address of the source is "5", it is determined that the AV device 200 is an audio system.

If it is determined that the source address is a global address (S620-Y), that is, if the logical address of the source is "12" or "13", it is impossible to determine the type of the AV device 200 using only the logical address of the source. Accordingly, the DTV controller 130 may extract the Device type field from the Report Physical Address message, and may determine the type of the AV device 200 (S640). For example, when the value of Device type field is 1, it is determined that the AV device 200 is a recording device, and when the value of Device type field is 3, it is determined that the AV device 200 is a tuner. When the value of Device type field is 4, it is determined that the AV device 200 is a playback device, and when the value of Device type field is 5, it is determined that the AV device 200 is an audio system.

So far, processes for ensuring a greater number of logical addresses using non-use address space even if all the logical addresses corresponding to the type of device are currently being used when an external device is connected have been described according to an exemplary embodiment of the present invention.

Although the video system is configured by connecting the DTV and the DVD players in the exemplary embodiment of the present invention, the present invention is applicable to a video system including other video devices. The devices constituting the video system can comprise a DTV, a DVD player, a personal video recorder (PVR), a hard disk drive (HDD) player, a Blu-ray disk (BD) recorder, a video cassette recorder (VCR), a home theatre system, a personal multimedia player (PMP), a digital camcorder, or other devices.

The reserved addresses "12" and "13" are used as global addresses in the exemplary embodiment of the present invention, but the present invention is not limited thereto. Accordingly, any non-use logical address space may be used as global addresses even though addresses "12" and "13" are not used.

Additionally, the video devices for constituting the video system are connected according to the HDMI CEC specification to facilitate understanding of the present invention. Besides the HDMI CEC specification, the present invention is applicable to any scheme for transmitting and receiving video signals and messages between the video devices.

In the following, other exemplary embodiments of the present invention are described in detail with reference to FIGS. 7 to 9.

Figure 7:
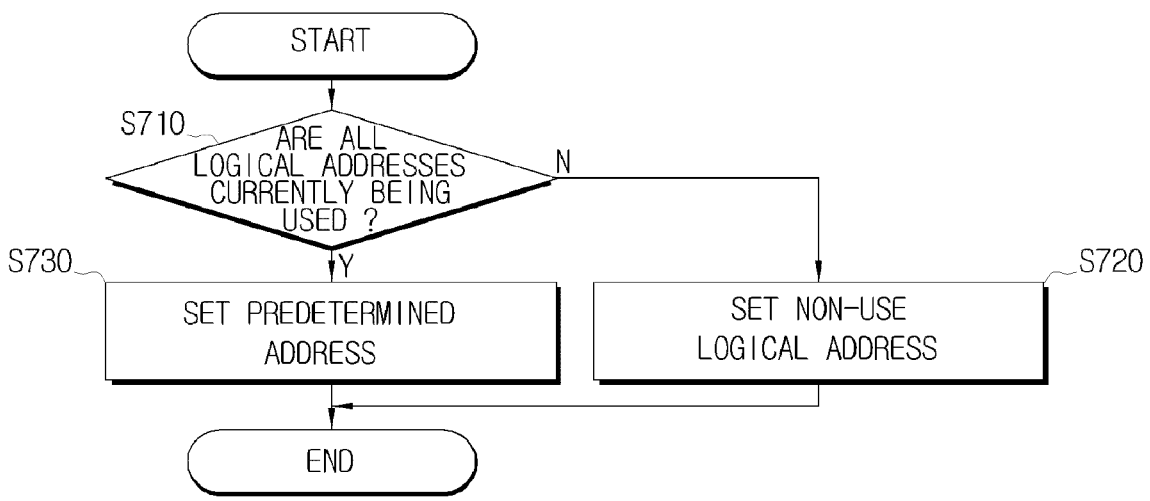
FIG. 7 is a flowchart explaining an address management method according to another exemplary embodiment of the present invention.

According to the address management method of FIG. 7, the AV device 200 determines whether all logical addresses corresponding to the type of the device are currently being used by external devices (S710). If it is determined that one of the logical addresses is currently not in use (S710-N), the AV device 200 may set a non-use logical address as its logical address (S720). If it is determined that all the logical addresses are currently being used (S710-Y), the AV device 200 may set a predetermined address as its logical address (S730).

Figure 8:
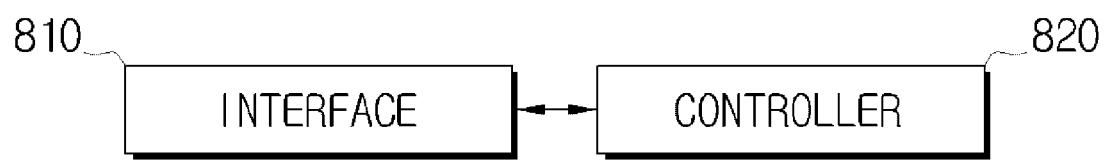
FIG. 8 is a block diagram of a device according to another exemplary embodiment of the present invention.

As shown in FIG. 8, a device according to another exemplary embodiment of the present invention comprises an interface 810 and a controller 820. The interface 810 is connected to external devices so that communication with the external devices can be performed. The controller 820 checks whether all logical addresses corresponding to the type of the AV device 200 are currently being used by external devices connected through the interface 810. If it is determined that one of the logical addresses is currently not in use, the controller 820 may set a non-use logical address as a logical address of the device 200, and if it is determined that all the logical addresses are currently being used, the controller 820 may set a predetermined address as a logical address of the device 200.

Figure 9:
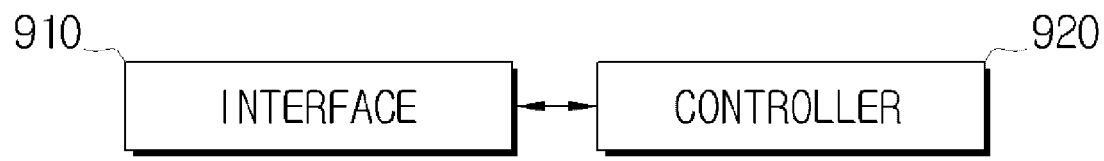
FIG. 9 is a block diagram of a display device according to another exemplary embodiment of the present invention.

As shown in FIG. 9, a display device according to another exemplary embodiment of the present invention comprises an interface 910 and a controller 920. The interface 910 receives a data packet comprising device type information from the external AV device 200. The controller 920 extracts and interprets the device type information only when the logical address of the external AV device 200 connected through the interface 910 is not a predetermined address.

As described above, according to the exemplary embodiments of the present invention, it is possible to use a greater number of addresses in addition to predefined logical addresses. Specifically, even when there is no logical address corresponding to the type of the AV device, an unregistered address is directly not set as the logical address, and non-use addresses "12" and "13" that are currently reserved are used as logical addresses. Accordingly, it is possible to use additional logical addresses regardless of the type of device, which can permit a greater number of devices to be supported.

The foregoing exemplary embodiments and advantages are merely exemplary and are not to be construed as limiting the present invention. The present teaching can be readily applied to other types of devices. Also, the description of the exemplary embodiments of the present invention is intended to be illustrative, and not to limit the scope of the claims, and many alternatives, modifications, and variations will be apparent to those skilled in the art.

What is claimed is:

1. An address management method comprising:
   determining, by a device, whether logical addresses corresponding to a type of the device are currently being used by external devices, wherein the external devices are connected according to the High Definition Multimedia Interface (HDMI) Consumer Electronics Control (CEC) specification;
   setting, by the device, a non-use logical address corresponding to the type of the device as a logical address of the device, if it is determined that one of the logical addresses corresponding to the type of the device is currently not in use; and
   setting, by the device, a predetermined, type-specific logical address that does not correspond to the type of the device as a logical address of the device, if it is determined that all the logical addresses corresponding to the type of the device are currently being used.

2. The method as claimed in claim 1, wherein the logical addresses comply with a logical address specification predefined according to the High Definition Multimedia Interface Consumer Electronics Control specification.

3. The method as claimed in claim 1, further comprising:
   transmitting a data packet comprising a physical address field and a device type field, after the logical addresses are acquired; and
   extracting data of the device type field from the data packet and interpreting the extracted data.

4. The method as claimed in claim 3, further comprising transmitting the logical addresses from the device, wherein the extracting and interpreting the data is performed only if the logical address is not the predetermined address.

5. The method of claim 1, wherein the device determines whether all logical addresses corresponding to a type of the device are currently being used by external devices.

6. The method of claim 1, wherein if all of the reserved addresses are already being used, the device sets an unregistered address as its own logical address.

7. The method of claim 1, wherein a reserved address among the logical addresses defined in the HDMI CEC specification is used as the predetermined logical address.

8. An address management method comprising:
   determining, by a device, whether logical addresses corresponding to a type of the device are currently being used by external devices;
   setting, by the device, a non-use logical address corresponding to the type of the device as a logical address of the device, if it is determined that one of the logical addresses corresponding to the type of the device is currently not in use; and
   setting, by the device, a predetermined, type-specific logical address that does not correspond to the type of the device as a logical address of the device, if it is determined that all the logical addresses corresponding to the type of the device are currently being used;
   wherein the determining comprises:
   transmitting polling messages from the device to the logical addresses corresponding to its device type; and
   determining that the corresponding logical addresses are currently being used if an acknowledge packet is received from one of the external devices as a response to the polling messages.

9. The method of claim 8, wherein a reserved address among the logical addresses defined in the HDMI CEC specification is used as the predetermined logical address.

10. A device comprising:
    an interface through which the device is connected to an external device; and
    a controller which determines whether all logical addresses corresponding to a type of the device are currently being used by external devices, sets a non-use logical address corresponding to the type of the device as a logical address of the device if it is determined that one of the logical addresses corresponding to the type of the device is currently not in use, and sets a predetermined, type-specific logical address that does not correspond to the type of the device as a logical address of the device if it is determined that all the logical addresses corresponding to the type of the device are currently being used.

11. The display device of claim 10, wherein the predetermined address refers to a global logical address that may be used regardless of a type of the device.

12. The display device of claim 10, wherein the predetermined address refers to an unregistered address.

13. The display device of claim 10, wherein the predetermined address refers to an unregistered address if all logical addresses corresponding to a type of device are currently being used and if all global logical addresses corresponding to a logical address that may be used regardless of the type of device are currently being used.

14. The method of claim 10, wherein a reserved address among the logical addresses defined in the HDMI CEC specification is used as the predetermined logical address.

15. A display device comprising:
    an interface which receives a data packet comprising a device type field from an external device; and a controller which extracts data of the device type field and interprets the extracted data if a predetermined, type-specific logical address that does not correspond to a type of the external device is used as a logical address of the external device, wherein the predetermined logical address complies with a logical address specification predefined according to the High Definition Multimedia Interface (HDMI) Consumer Electronics Control (CEC) specification.

16. The display device of claim 15, wherein the predetermined address refers to a logical address that may be used regardless of a type of the device.

17. The method of claim 15, wherein a reserved address among the logical addresses defined in the HDMI CEC specification is used as the predetermined logical address.

18. An address management method comprising:
   determining, by a device, whether logical addresses corresponding to a type of the device are currently being used by external devices, wherein the external devices are connected according to the High Definition Multimedia Interface (HDMI) Consumer Electronics Control (CEC) specification;
   setting, by the device, a non-use logical address corresponding to the type of the device as a logical address of the device, if it is determined that one of the logical addresses corresponding to the type of the device is currently not in use; and
   setting, by the device, a predetermined, logical address that does not correspond to the type of the device as a logical address of the device, if it is determined that all the logical addresses corresponding to the type of the device are currently being used,
   wherein a reserved address among the logical addresses defined in the HDMI CEC specification is used as the predetermined logical address.

19. An address management method comprising:
   determining, by a device, whether logical addresses corresponding to a type of the device are currently being used by external devices;
   setting, by the device, a non-use logical address corresponding to the type of the device as a logical address of the device, if it is determined that one of the logical addresses corresponding to the type of the device is currently not in use; and
   setting, by the device, a predetermined, logical address that does not correspond to the type of the device as a logical address of the device, if it is determined that all the logical addresses corresponding to the type of the device are currently being used;
   wherein a reserved address among the logical addresses defined in an High Definition Multimedia Interface (HDMI) Consumer Electronics Control (CEC) specification is used as the predetermined logical address;
   wherein the determining comprises:
   transmitting polling messages from the device to the logical addresses corresponding to its device type; and
   determining that the corresponding logical addresses are currently being used if an acknowledge packet is received from one of the external devices as a response to the polling messages.

20. A device comprising:
   an interface through which the device is connected to an external device; and
   a controller which determines whether all logical addresses corresponding to a type of the device are currently being used by external devices, sets a non-use logical address corresponding to the type of the device as a logical address of the device if it is determined that one of the logical addresses corresponding to the type of the device is currently not in use, and sets a predetermined logical address that does not correspond to the type of the device as a logical address of the device if it is determined that all the logical addresses corresponding to the type of the device are currently being used,
   wherein a reserved address among the logical addresses defined in an High Definition Multimedia Interface (HDMI) Consumer Electronics Control (CEC) specification is used as the predetermined logical address.

21. A display device comprising:
   an interface which receives a data packet comprising a device type field from a external device; and
   a controller which extracts data of the device type field and interprets the extracted data if a predetermined, logical address that does not correspond to a type of the external device is used as a logical address of the external device, wherein the predetermined logical address complies with a logical address specification predefined according to the High Definition Multimedia Interface (HDMI) Consumer Electronics Control (CEC) specification,
   wherein a reserved address among the logical addresses defined in the HDMI CEC specification is used as the predetermined logical address.

* * * * *